S. Peck,
Wash-Board,

No 59,257. Patented Oct. 30, 1866.

Witnesses
F. A. Jackson
Alex F. Roberts

Inventor
Sam Peck
Per Munn & Co
Attorneys

UNITED STATES PATENT OFFICE.

SAMUEL PECK, OF WEST HAVEN, CONNECTICUT.

IMPROVED RUBBER ATTACHMENT TO WASH-BOARDS.

Specification forming part of Letters Patent No. 59,257, dated October 30, 1866.

*To all whom it may concern:*

Be it known that I, SAMUEL PECK, of West Haven, in the county of New Haven and State of Connecticut, have invented a new and Improved Rubber Attachment to Wash-Boards; and I do hereby declare that the following is a full, clear, and exact description thereof, which will enable others skilled in the art to make and use the same, reference being had to the accompanying drawings, forming a part of this specification, in which—

Figure 1:
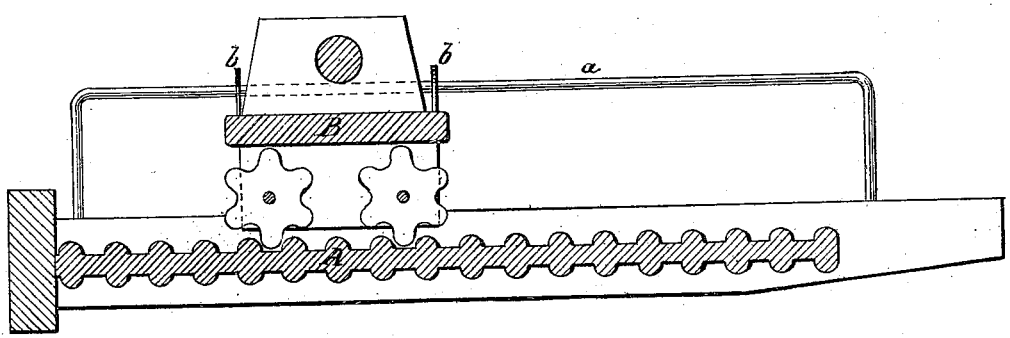
Figure 2:
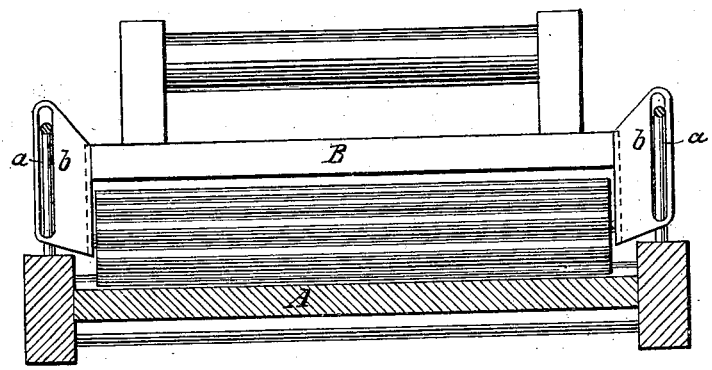

Figure 1 represents a longitudinal vertical section of this invention. Fig. 2 is a transverse section of the same.

Similar letters of reference indicate like parts.

This invention consists in the arrangement of side rails, which are secured on the sides of a wash-board, and form the guides for slotted lugs or ears projecting from the ends of the rubber in such a manner that said rubber can be easily carried over the wash-board or turned up at its ends if it is desired to introduce or remove the articles to be washed from between the rubber and wash-board.

A represents a wash-board of any desirable construction, and made of wood or any other suitable material. In the sides of this wash-board are secured two rails, *a*, one in each side, which form the guides for slotted lugs or ears *b*, secured to the ends of the rubber B. Said rubber is made with two corrugated rollers, which correspond to the corrugations of the wash-board, or it may be made in any other desirable manner, and it is provided with a suitable handle, which serves to carry the same back and forth over the surface of the wash-board.

By the combined action of the lugs and rails the operation of the rubber is facilitated, the corrugated rollers being always held in the proper position in relation to the corrugations of the wash-board, and by the peculiar form of the rails, in combination with the oblong slots in the ears of the rubber, I am enabled to turn said rubber back over the end of the wash-board, so that the operation of introducing the articles to be washed between it and the wash-board, or that of removing said articles from between the rubber and the board, is materially facilitated.

If the rubber is turned out of the way, the wash-board may be used like an ordinary wash-board.

Having thus described my invention, I claim as new and desire to secure by Letters Patent—

The rails *a* on the sides of the wash-board A, in combination with the slotted ears *b* on the ends of the rubber B, substantially as and for the purpose set forth.

SAMUEL PECK.

Witnesses:
   M. M. LIVINGSTON,
   ALEX. F. ROBERTS.